United States Patent
Yellepeddy et al.

(10) Patent No.: US 10,523,424 B2
(45) Date of Patent: Dec. 31, 2019

(54) OPTIMIZING USE OF HARDWARE SECURITY MODULES

(71) Applicant: International Business Machines Corporation, Armonk, NY (US)

(72) Inventors: Krishna K. Yellepeddy, Austin, TX (US); John T. Peck, Austin, TX (US); Kristin M. Hazlewood, Austin, TX (US); John A. Morganti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 15/699,541

(22) Filed: Sep. 8, 2017

(65) Prior Publication Data

US 2018/0013548 A1    Jan. 11, 2018

Related U.S. Application Data

(63) Continuation of application No. 14/164,402, filed on Jan. 27, 2014, now Pat. No. 9,794,063, which is a continuation of application No. 12/782,551, filed on May 18, 2010, now Pat. No. 8,675,875.

(51) Int. Cl.
*H04L 29/06* (2006.01)
*H04L 9/08* (2006.01)
*G06F 21/79* (2013.01)

(52) U.S. Cl.
CPC ............ *H04L 9/08* (2013.01); *G06F 21/79* (2013.01); *H04L 9/088* (2013.01); *H04L 9/0897* (2013.01)

(58) Field of Classification Search
CPC ........................................................ H04L 9/08
USPC .................................................... 380/277
See application file for complete search history.

(56) References Cited

U.S. PATENT DOCUMENTS

| | | | |
|---|---|---|---|
| 6,963,980 B1 * | 11/2005 | Mattsson | G06F 21/6227 713/193 |
| 7,069,450 B2 | 6/2006 | Benaloh | |
| 7,593,532 B2 | 9/2009 | Plotkin et al. | |
| 7,599,497 B2 | 10/2009 | Soppera | |
| 2002/0138722 A1 * | 9/2002 | Douceur | H04L 9/0825 713/153 |
| 2004/0039925 A1 | 2/2004 | McMillan et al. | |

(Continued)

OTHER PUBLICATIONS

Rouse, M. "Hardwre security module (HSM)"; retrieved on Jan. 25, 2017 from http://searchaws.techtarget.com/.

(Continued)

*Primary Examiner* — Harris C Wang
(74) *Attorney, Agent, or Firm* — Robert H. Frantz; Jeffrey S. LaBaw

(57) ABSTRACT

Use of cryptographic key-store hardware security modules is optimized in a system having a first scarce high-security key storage device and a second more plentiful low-security key storage device comprising securing a cryptographic key to the higher security level by initially storing the key in the first storage device, then responsive to an event, evaluating the stored key against one or more rules, and subsequent to the evaluation, reclassifying the stored key for relocation, encrypting the reclassified key using a key-encryption key; relocating the reclassified key into the second, lower-security storage device, and storing the key-encryption key in the first storage device.

18 Claims, 5 Drawing Sheets

(56) References Cited

U.S. PATENT DOCUMENTS

| | | | |
|---|---|---|---|
| 2005/0138374 | A1 | 6/2005 | Zheng et al. |
| 2006/0136525 | A1* | 6/2006 | Akelbein .............. G06F 3/0608 |
| 2006/0288232 | A1* | 12/2006 | Ho ..................... G06F 21/6227 713/185 |
| 2007/0127719 | A1 | 6/2007 | Selander et al. |
| 2008/0319909 | A1* | 12/2008 | Perkins ................. G06Q 10/00 705/50 |
| 2009/0046862 | A1 | 2/2009 | Ito et al. |
| 2009/0092252 | A1* | 4/2009 | Noll ........................ H04L 9/083 380/277 |
| 2009/0169012 | A1 | 7/2009 | Smith et al. |
| 2009/0323937 | A1 | 12/2009 | Teng et al. |
| 2010/0318468 | A1* | 12/2010 | Carr ..................... G06Q 20/027 705/79 |
| 2011/0191599 | A1* | 8/2011 | Chou ..................... G06F 12/14 713/193 |

OTHER PUBLICATIONS

Rouse, M. "HSM (Hierarchical Storage Management", retrieved on Jan. 25, 2017 from http://searchstorage.techtarget.com/.

Wikipedia; "Hardware security module", retrieved on Jan. 25, 2017 from https://en.wikipedia.org.

Wikipedia; "Hierarchical storage management"; retrieved on Jan. 25, 2017 from https://en.wikipedia.org.

Cren; "Hardware Security Modules" Retrieved on Apr. 30, 2010 from http://www.cren.net/crenca/onepagers/hsm2.html.

IBM Corp.; "IBM Crypto Server Management General Information Manual" Copyright International Business Machines Corporation 2000; First Edition, May 2000.

IBM Corp.; "Keystore Configurations"; Retrieved on Apr. 30, 2010 from http://publib.boulder.ibm.com infocenter wasinfo v6r1 topic com.ibm.we . . . .

IBM Corp.; "Cryptographic Hardware Use with Tivoli Access Manager for e-Business: SSL Acceleration in WebSEAL with a Hardware Security Module"; Retrieved on Apr. 30, 2010 from http://www.ibm.com/developerworks/tivoli/library/t-sslwebseal/.

IBM Corp.;"IBM Cryptographic Products-IBM PCI Cryptographic Coprocessor General Information Manual"; Sixth Edition (May 2002); Copyright International Business Machines Corporation 1997, 2002.

IBM Corp.;"IBM PCI Cryptographic Coprocessor"; Retrieved on Apr. 30, 2010 from http://www-03.ibm.com/security/cryptocards/pcicc/overview.shtml.

IBM Corp.;"UltraCypher Cryptographic Engine" Copyright International Business Machines Corporation 1998.

SANS Institute;"SANS Institute InfoSec Reading Room" Version 1.2f of GSEC Practical Assignment for GIAC Certification for Jim Attridge; Copyright SANS Institute 2002.

FIPS PUB;"Security Requirements for Cryptographic Modules"; Federal Information Processing Standards Publication Supercedes FIPS PUB 140-1, Jan. 1, 1994.

* cited by examiner

OPTIMIZING USE OF HARDWARE SECURITY MODULES

CROSS-REFERENCE TO RELATED APPLICATIONS

Claiming Benefit Under 35 U.S.C. 120

This is a continuation application of U.S. patent application Ser. No. 14/164,402, filed on 2014 Jan. 27, which was a continuation application of U.S. patent application Ser. No. 12/782,551, now U.S. Pat. No. 8,675,875, filed on May 18, 2010, by Krishna K. Yellepeddy, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The following published documents are incorporated by reference in their entireties:
(a) "IBM Crypto Server Management General Information Manual", document CSM-1000-01, First Edition, May, 2000, published by International Business Machines Corp.
(b) "IBM PCI Cryptographic Coprocessor General Information Manual", Sixth Edition (May 2002), published by International Business Machines Corporation.
(c) "Federal Information Processing Standards Publication: Security Requirements for Cryptographic Modules", FIPS PUB 140-2, Jan. 1, 1994, published by the U.S. Department of Commerce, National Institute of Standards and Technology.

BACKGROUND

Field of the Invention

The invention generally relates to Hardware Security Modules employed in cryptographic key management technologies.

Background Information

Many electronic and online transactions utilize cryptographic keys between two or more cooperating computers in order to protect sensitive information, such as personal information, credit card numbers, transaction authorizations, and the like. One widely used cryptographic key process is Public Key Infrastructure (PKI), but many others exist as well, including proprietary and other "public" or "open" key processes and standards.

Creation of new cryptographic keys (hereinafter "keys"), and use of them to decode and encode protected data is process-intensive. For small computers which are only serving a few processes at one time, such as a handheld personal computer or a desktop computer, these processes may reasonably be handled in software modules without noticeable detriment to the performance or responsiveness of the small computer.

However, for larger computing environments, such as web servers and Electronic Data Interchange servers, creation of keys and key-based operations (encryption/decryption) for a large number of processes simultaneously, such as a large number of connections to web browsers or electronic Automatic Teller Machines, can be so resource intensive that performance of the servers is severely degraded for specified performance criteria such as maximum time to process a particular transaction, latency to use of real time data, etc.

As more and more client computers attach to electronic networks such as Wi-Fi, LAN, intranets, and the World Wide Web, and as more and more sensitive transactions are added to the networked environment, such as stock trading on wireless phones, the demand on servers to create and use keys is growing significantly.

Existing architectures of hardware, software, and networking address these demands only to a certain extent. Specialized "co-processor" hardware is available which either installs into a server, or which networks to a server, in order to off-load the key creation and key usage operations from the rest of the server's functions, leaving the server to handle other tasks such as web page serving, dynamic generation of HTML, database management, etc.

Similarly, appropriate storage of cryptographic keys is important to maintain the security value of any cryptographic arrangement, whereas unauthorized access to keys may ultimately lead to unauthorized access to the data they protect, thereby comprising the entire arrangement. Standards have evolved in the industry to allow buyers and purchasers to understand the relative security level of products and services being offered by the various vendors. One such standard is known as FIPS 140, or Federal Information Processing Standard 140, promulgated by the National Institute of Standards and Technology (NIST). It requires a particular validation program in order for a new product or service to be certified to a particular level of security, wherein Level 1 is the lowest level of security and generally requires the least resources to meet, and Level 4 is the highest level of security but also generally demands the greatest resources.

In order to meet and maintain certain "levels" of security, then, specialized key storage hardware has been developed, referred to as Hardware Security Modules ("HSM"). While the term sounds generic out of context, in the context of cryptographic computing, HSM specifically refers to specialized hardware-based key storage which meets a specified security level.

One widely-used solution for key creation, use, storage and management is from International Business Machines Corporation (IBM)™, known as Crypto Server Management (CSM), which makes possible centralization of the management of cryptographic accelerator hardware and HSM, in particular IBM 4758 PCI Cryptographic Coprocessors, which are installed in remote computers. Using such an arrangement has lessened the need for local crypto-skilled personnel, reduced on-site support of crypto coprocessors from skilled personnel, enabled quick recovery after an unplanned stop of crypto-coprocessors, provided new crypto-functions, and allowed new keys to be introduced centrally with no need for local procedures. Additionally, there is no need for unsecured or difficult procedures for backup of keys, and no need for shipping initialized coprocessors (the tamper resistance of a 4758 makes it sensitive for physical handling with the risk that a initialized 4758 is useless at arrival and must be reinitialized). The security benefits provided by such an arrangement include no vulnerability of local keys, no exposure of exchanged keys, centralized control over code and all keys in the network, defined level of security can be easily enhanced when needed, and no need for having tight control over shipped initialized 4758s.

SUMMARY OF THE INVENTION

The invention automatically manages the lifecycle of keys and their transition to lower quality key-stores as the keys become less critical. The use of the cryptographic key-store hardware security modules is optimized in a system having a first scarce high-security key storage device and a second more plentiful low-security key storage device comprising securing a cryptographic key to the higher security level by initially storing the key in the first storage device, then responsive to an event, evaluating the stored key against one or more rules, and subsequent to the evaluation, reclassifying the stored key for relocation, encrypting the reclassified key using a key-encryption key; relocating the reclassified key into the second, lower-security storage device, and storing the key-encryption key in the first storage device.

A benefit of the present invention is that a larger number of cryptographic keys can be managed in the more secure environment provided by Hardware Security Modules, which reduces cost of operation and compliance to the customer or owner of a computing environment.

BRIEF DESCRIPTION OF THE DRAWINGS

The following detailed description when taken in conjunction with the figures presented herein provide a complete disclosure of the invention.

DETAILED DESCRIPTION OF ONE OR MORE EMBODIMENTS OF THE INVENTION

Figure 1:
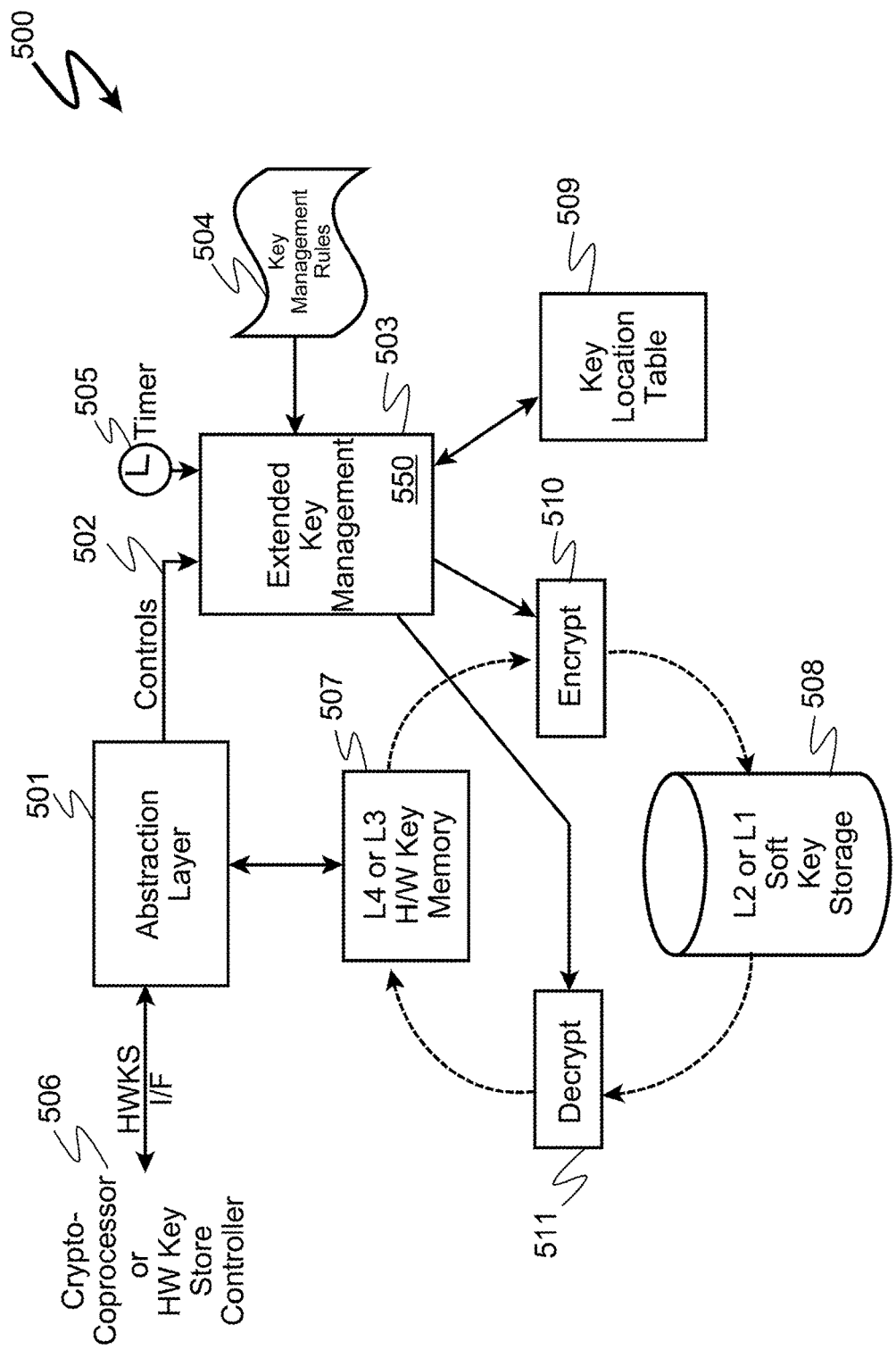
FIG. 1 illustrates logical processes according to the present invention.

The present inventors have identified a problem in the art relating to secure storage and management of cryptographic keys (hereinafter "keys") not previously recognized by those skilled in the art. The recognized problem stems from the fact that the number of keys in a customer environment keeps growing. Compounding the problem is that some of these customers have a requirement to keep these keys in a hardware based key-store in order to comply with regulations or business policies. But, hardware security modules (HSM) have limited space, e.g., some hardware modules have as little as 64 KB of secure data storage for keeping a limited number of keys and handles.

The inventors have realized that, for a centralized key manager with a large number of cryptographic keys, it may not be possible to store all the keys in a hardware based key-store because of limited space in the key-store. The solution envisioned by the inventors is to provide a way to transition the keys from highly-secure, expensive and scarce hardware storage to less expensive, more plentiful and potentially less-secure forms of key-stores. A problem solved by the inventors to achieve such improvement in the art has been determining how to use hardware security modules to their best advantage while avoiding keeping all key materials in the hardware security modules.

As the reader will recognize from the following detailed description of the invention and embodiments according to the invention, a first point of novelty of this invention is that a set of rules are defined controlling encryption key classification and storage location as a function of key usage and data usage (e.g. data protected by keys). For example, a high frequency of usage of a key for decryption of data on different storage media may imply there is a large amount of data encrypted with this key, and therefore, according to management rules, that key is kept in higher secure storage longer. Conversely, a low level of usage of a key (or the data it protects) may indicate that the key protects a small amount of data or less important data, and thus the key can be moved to a lower secure storage with certain provisions as set forth in the following paragraphs.

Basic Crypto Server Arrangements

Crypto servers typically comprise a "standard" or well known computing platform, such as an IBM AS/400 server, a "PC"-based server, etc., running any suitable operating system, such as IBM AIX™, OS/2™, UNIX™, Microsoft Windows NT™, etc.

The following description of basic CSM arrangements is taken from "IBM Crypto Server Management General Information Manual", document CSM-1000-01, First Edition, May, 2000, published by International Business Machines Corp.

From a CSM point of view, a set-up of Crypto Servers in a network can be of any kind. It can support e.g. a Branch network where a lot of branches each have one or more Crypto servers. Or, it can support a more centralized set-up where the Crypto Servers to manage all are centrally located in one or more machine halls.

Both set-ups can be separately defined within CSM, but it can also be mixed, making it possible that keys at the central Crypto Servers can also be present at the Branch Crypto Servers.

How a specific Crypto Server set-up looks at each customer, or how different Crypto Server set-ups are mixed is a fully customizable possibility.

Figure 2:
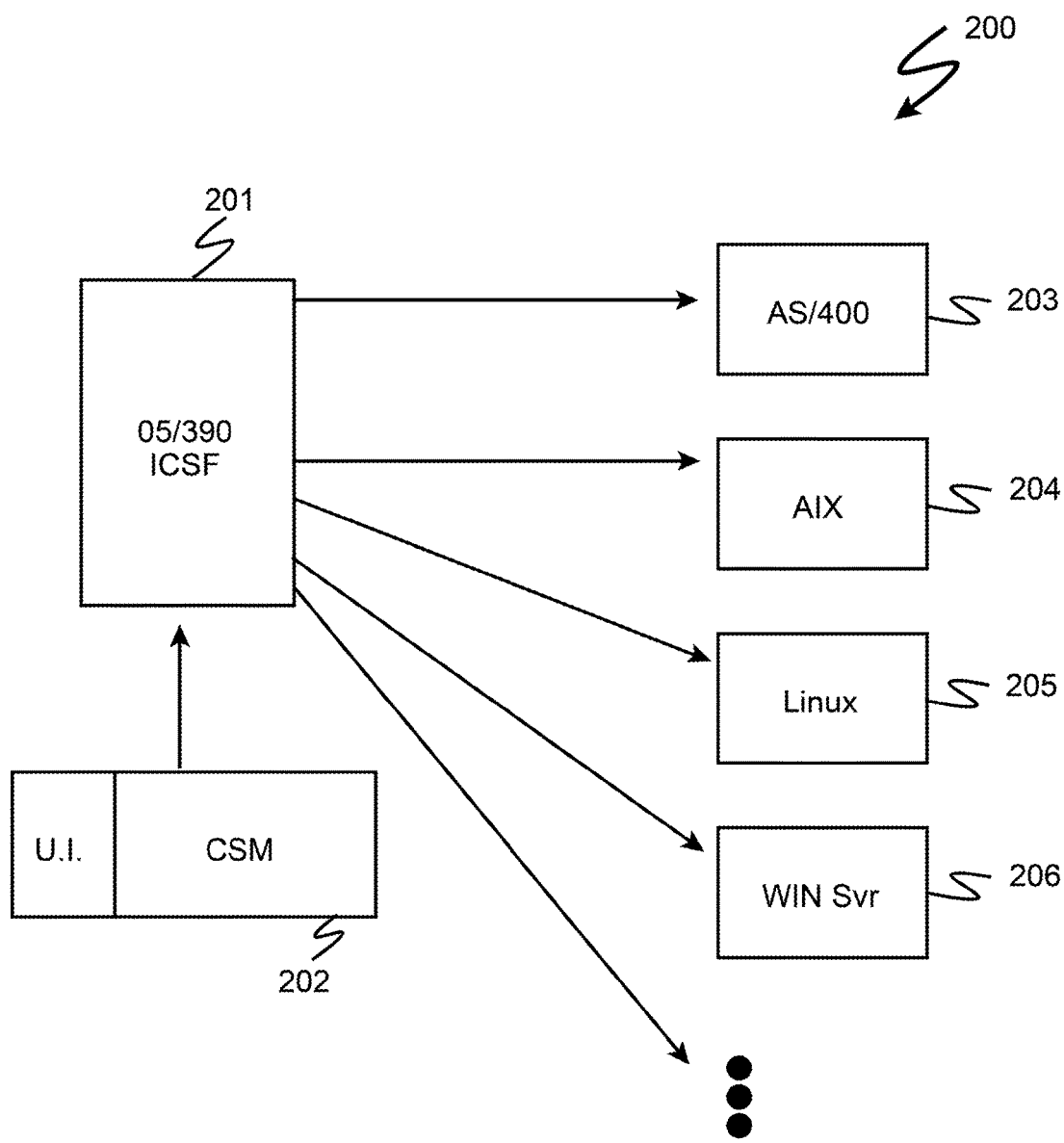
FIG. 2 depicts an "On-line" configuration of Crypto Server Management (CSM).

A Crypto Server set-up (200) might look as illustrated in FIG. 2, if a central host (201) communicating with the Crypto Servers (203, 204, 205, 206) is involved. This is called the CSM On-line version.

The On-line version enables keys generated for the Crypto Server to be directly available also for OS/390 Integrated Cryptography Service Facility (ICSF) (or IBM 4753) on up to 30 logical partitions (LPARs), making it possible to ensure communication between host and Crypto Servers.

All keys are stored on OS/390 DB2 tables, taking advantage of normal back-up and recovery procedures on OS/390.

Figure 3:
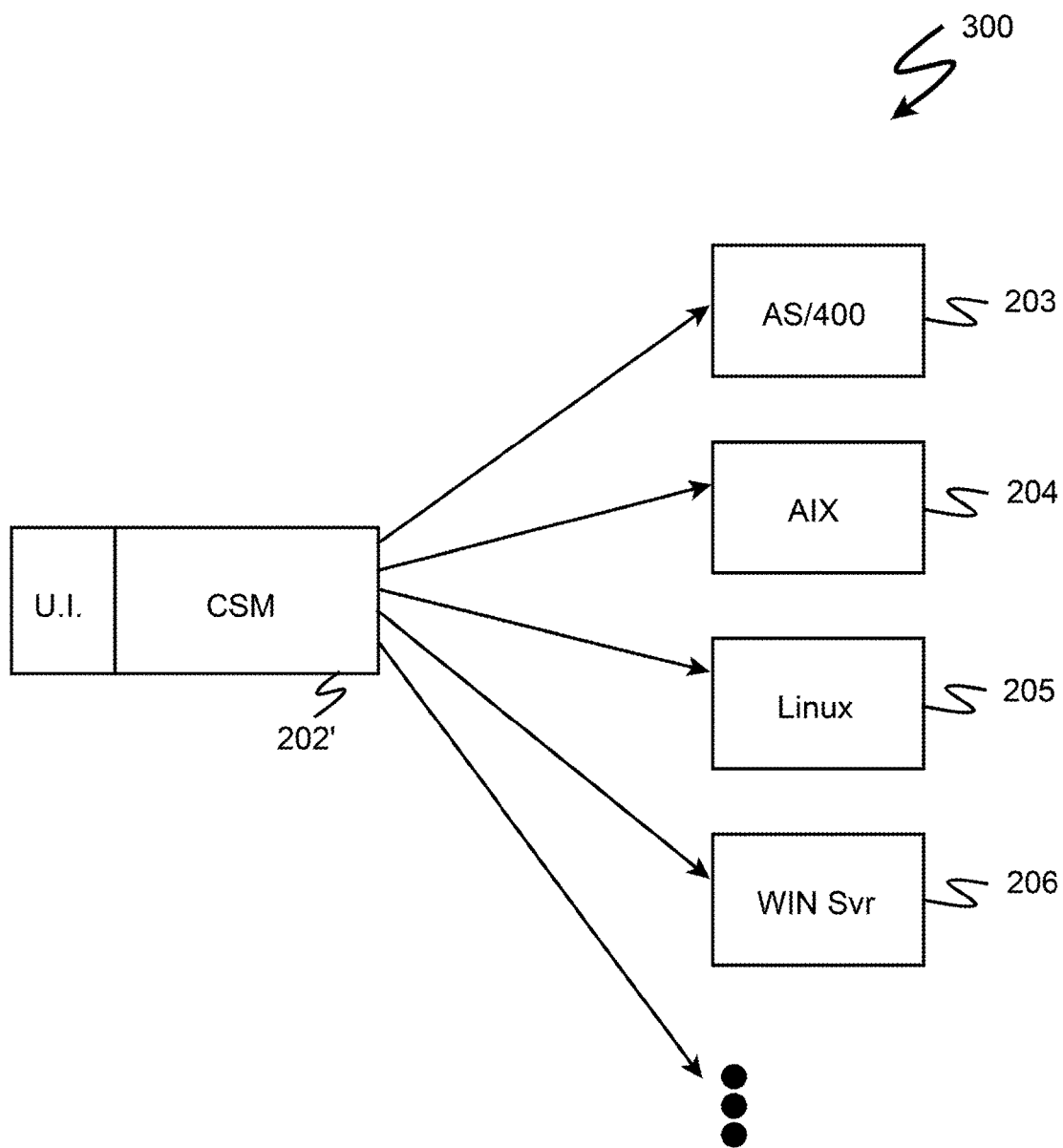
FIG. 3 shows a "Stand-alone" configuration of Crypto Server Management (CSM).

If the set-up does not include a central host, CSM in a Stand-alone set-up (300) still makes it possible to administer the Crypto Servers, as shown in FIG. 3. In the Stand-alone version, keys are stored locally on the CSM Workstation (202') (and must be backed up locally).

As indicated by the ellipses " . . . " in both FIGS. 2 and 3, the CSM has no problem supporting exchange of keys with other platforms and other Crypto engines than the IBM 4758 and 4755.

The CSM can be customized to support other Crypto Architectures than CCA (Common Cryptographic Architecture) from IBM. From the Key exchange perspective, it is therefore possible to generate and exchange keys with non-IBM Crypto engines. It is also possible to mix the hierarchy so that keys are generated for both the IBM world and other Crypto engines.

From CSM perspective, all that needs to be done is to define the new Crypto architecture within CSM and exchange the 4758/4755-APIs of the CSM programs on the Crypto Server with the APIs from the relevant Crypto vendor.

More general information on CSM configurations may be found by the reader in the aforementioned publication. It will be readily recognized by those skilled in the art that the present invention is not limited to use and implementations in conjunction with the specific hardware and software components which will be described in the following paragraphs, but rather, the invention may be also use in conjunction with other cryptographic key storage systems, product, technologies, and services. The specific hardware and software mentioned herein are for example illustration only.

Basic HSM Architecture

It will be useful for understanding the present invention to also understand the general architectures of Cryptographic Key Hardware Security Modules (HSM). The following detailed description of an IBM 4758 will be used to illustrate the more general concepts which are present in most HSM's. It will be recognized by those skilled in the art that the present invention is not limited to implementation with or usefulness with only this particular HSM, but instead, its benefits may be realized with a wide array of HSM products.

The following information is taken from "IBM PCI Cryptographic Coprocessor General Information Manual", Sixth Edition (May 2002), published by International Business Machines Corporation.

Figure 4:
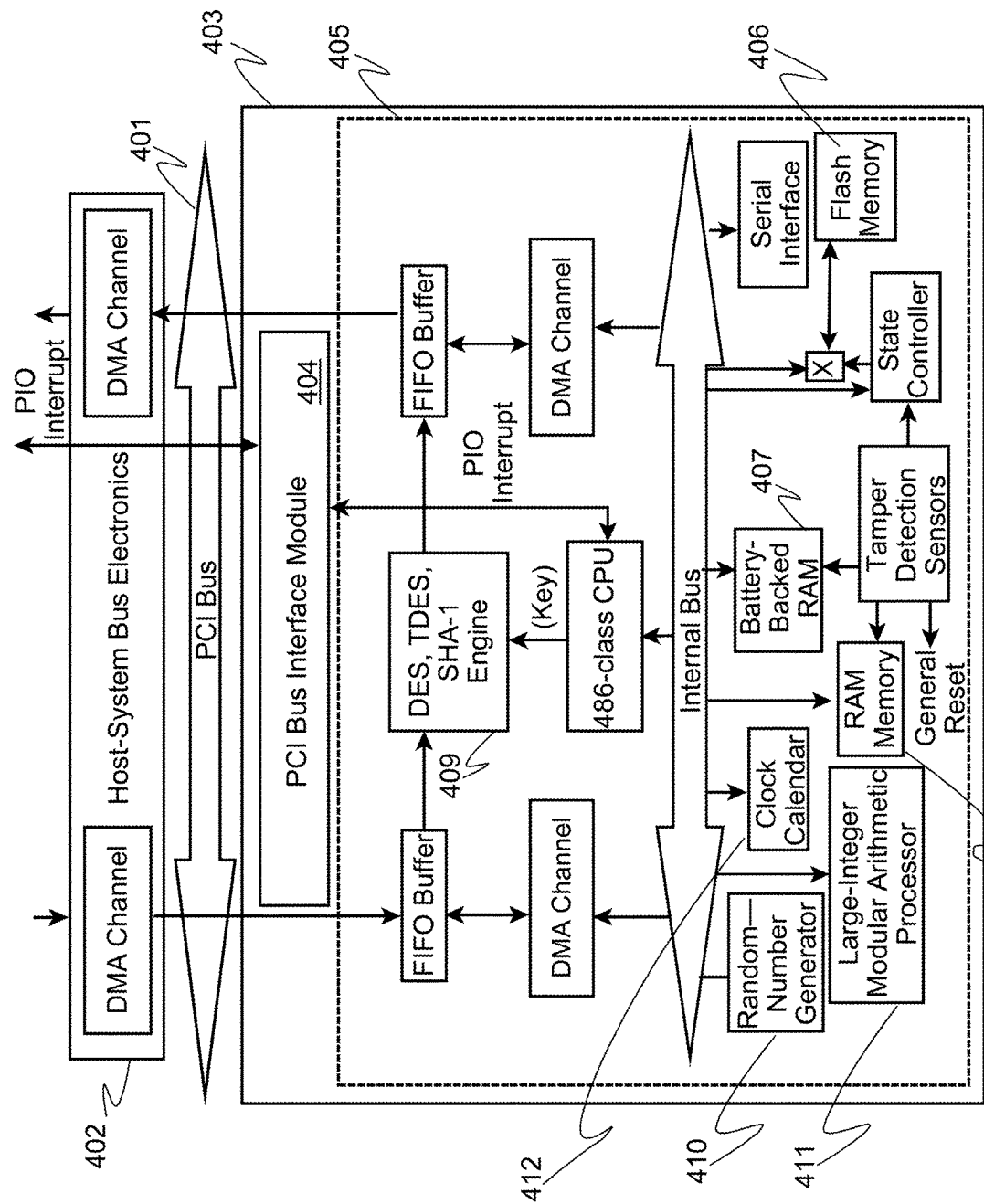
FIG. 4 sets forth a block diagram of the architecture of a Hardware Security Module with embedded cryptographic co-processor.

The cryptographic Coprocessor subsystem (403), shown schematically in FIG. 4, has of these elements:

(a) Tamper Detection Sensors. Models 001 and 002 and Models 013 and 023 differ in the approach to tamper detection. The FIPS 140-1 level 4 rated Models 001 and 002 surround the internal electronics with a polyurethane mixture and a film with an imprinted circuit pattern to detect minute penetration and erosion attacks. The FIPS 140-1 level-3-rated Models 013 and 023 employ an electrical circuit connected to the steel case to detect attempts at opening the case. Additional environmental sensors implement additional tamper-detection techniques. The Models 001 and 002 implement a full complement of techniques to monitor environmental conditions: high and low temperature, power sequencing, and radiation. All of the sensors are continuously powered from the time of factory initialization and certification to the end of productive life of the Coprocessor. Any sensor-detected tamper event causes immediate power loss to the battery-backed RAM (407) resulting in zeroization of this memory, and a subsystem reset resulting in a processor shutdown and the end of RAM-memory refresh cycles. The result is the immediate destruction of any sensitive data stored in these memories and the CPU.

(b) Central Processing Unit (CPU). A 486-class CPU provides an industry-standard computing environment for flexible control of secure processing and cryptographic algorithms and processes.

(c) PCI Bus Interface Processor Module. This module (404) couples the secured electronics to the PCI bus (401) and provides for busmaster operation with inbound and outbound DMA operations (402) between the FIFO buffers and the host-system memory. The module also provides mailboxes and interrupts to permit the exchange of control information between the Coprocessor and the host-system Coprocessor device driver.

(d) DES Engine. The DES engine (409) provides DES processing at high sustained rates. All models support 56-bit CBC and ECB DES encryption. Models 002 and 023 also support three-key triple-DES in outer CBC and ECB modes. Because of the need to inject keys under control of the subsystem software, to setup the FIFO buffer connection controls, and to initialize the DMA controllers, throughput is sensitive to the data block-size and to the host-system bus design and load.

(e) Random-Number Generator. An electronic noise source provides unpredictable input to a random bit-value accumulator (410). (The CP/Q++ control program periodically uses the hardware output to seed a FIPS 140-1 approved pseudo random-number generator. The control program provides both the raw accumulated hardware output and the pseudo random-number generator output to internal application programs.)

(f) Large-Integer Modular Arithmetic Processor. A 1024-bit or 2048-bitmodular-arithmetic processor (411) supports the processing that is the basis of cryptographic algorithms such as RSA, Diffie-Hellman, and DSA.

(g) Clock Calendar. A time and date source (412) accurate to within one minute per month provides a internal time value that is under the exclusive control of software running within the subsystem.

(h) RAM Memory. DRAM memory (408) is available for the use of subsystem software and data storage.

(i) Flash Memory. Two or four megabytes of electrically erasable, persistent-data memory (406) are incorporated in the design. IBM provides software to selectively encrypt sensitive data stored in flash memory. The encryption keys used for this are stored in battery-backed RAM and are zeroized in the event of a detected tamper event.

(j) Battery-Backed Random Access Memory (BBRAM). As with flash memory, a control program can restrict access to the battery-backed RAM (407). Read and write times are comparable to that of DRAM. The contents of this memory are quickly zeroized in the event of a detected tamper.

Other functions of the IBM 4578 shown in FIG. 4 are either self-explanatory, or may be understood by referencing the aforementioned publication. The functions and circuits described in the preceding paragraphs (a) through (j) are utilized in at least one embodiment of the present invention as set forth in the rest of this description.

Logical Processes

The following logical processes form a part of an embodiment according to the invention. In one possible embodiment, the following logical processes are implemented in software (or firmware) executed by a processor of a HSM, such as the 486-class microprocessor of an IBM 4578 HSM. In such an embodiment, the realization includes both the software (or firmware) and the requisite hardware processor, memory devices, clocks, buses, etc., to form a specific HSM machine having the new functionality as described herein.

In an initial phase of the logical process, which may be repeated or may be multi-threaded for concurrent, asynchronous performance, some attributes of key material are identified that can be stored outside the higher security hardware storage. These attributes form part of a rule set for controlling the HSM's new actions. Because of limited high secure hardware storage space, some, but not all, of the in-use keys are selectively moved from higher-secure, space-limited memory into a lower-secure but less-expensive, more plentiful database. The relocated keys, however, are encrypted themselves using a new key which is then stored in the higher security hardware key-store. We will refer to the process of designating certain keys and key material as eligible for relocation from hardware key-store to database as "reclassification". The new key created to encrypt the relocated keys, and which is stored in the higher-security hardware storage, will be referred to as a "key-encryption key" (KEK).

One benefit of this process is that handling disaster preparedness is that only the KEK's must be backed up in to secure storage, while the relocated (and encrypted) keys only must be backed up per lower security processes such as normal database backup mechanisms. As such, a hierarchy of key-stores with different security profiles/properties is realized, e.g. the 4758 HSM is at the top at FIPS 140 level 4, where the database holding the relocated (and encrypted) keys may be just FIPS 140 level 1 or 2.

Turning now to FIG. 1, these logical processes (500) are illustrated where an abstraction layer (501) allows different crypto-coprocessors and hardware key store controllers (506) to access and control (502) the new hierarchical, rules-driven extended key management (550) functions via a Hardware Key-Store (HWKS) Interface (I/F). This allows the exemplary embodiment to interoperate with any of a variety of crypto-coprocessors and hardware key store controllers.

Unique triggers on how keys get reclassified are embodied in this example in rule sets (504) used by the Extended Key Management (550) such as the following:

(a) Key Life-cycle Triggers. These rules operate using a timer or clock source (505) to cause the expiration of keys, certificates, and related key materials (KC&KM). KC&KM that are near expiration or have expired may be reclassified according to the rules to be relocated into lower-security storage (508) from the scarce, higher-security hardware storage (507), being encrypted (501) during relocation by a key-encryption key, and decrypted (511) upon reclassification and relocation back into scarce, higher-security hardware storage (507). A key location table (509) is used by the extended key management (550) to keep track of where each key is stored, and whether it must be decrypted using a key-encryption key before it is used.

(b) Protected Data Life-cycle Triggers. These rules operate using a timer or clock source (505) to cause the expiration of data which is protected by keys stored in the hardware key memory (507) or the soft key storage (508). When data designated as having an expiration date ages to near or past its expiration date, the key protecting that data is reclassified and relocated from the hardware key memory (507) to the soft key storage (508).

(c) Key Usage Triggers. These rules operate using a counter and a timer or clock to track how often or how recently each key stored in the higher-security key memory (507) has been used in a key operation. If the frequency of use reaches a minimum threshold, or the time since last use reaches a maximum threshold for a particular key, then the key is reclassified and relocated from the hardware key memory (507) to the soft key storage (508).

(d) Protected Data Usage Triggers. These rules operate using a counter and a timer or clock to track how often or how recently data which is protected by a key stored in the higher-security key memory (507) has been used in a key operation. If the frequency of protected data use reaches a minimum threshold, or the time since last use of the protected data reaches a maximum threshold for a particular key, then the associated key is reclassified and relocated from the hardware key memory (507) to the soft key storage (508).

A usage limit may be reached for the amount of data that has been encrypted after which the key is no longer used for encrypting new data. However, the key has been used to encrypt critical, confidential data and must continue to be maintained in highly secure storage even though of low key usage may indicate a lower classification, until the data that has been encrypted is classified to a lower level of criticality.

(e) Key Revocation Triggers. These rules operate to reclassify and relocate keys that have been revoked, whereas even though keys have been revoked, certain computing applications require the keys to be maintained for some extended period of time to meet legal, regulatory, or other compliance issues.

(f) Protected Data Reclassification Triggers. These rules operate to reclassify a key which is currently stored in hardware key memory (507) when the data that the key protects is reclassified. If the protected data is reclassified to a lower criticality, archived, or destroyed, then the key that protects that data is also reclassified and relocated into lower-security key storage (508).

For brevity in the foregoing paragraphs, the description of reclassifying and relocating of keys from higher-security hardware storage (507) to lower-security soft storage (508) has not explicitly stated in each example that the key being relocated is encrypted (510) using a key-encryption key (KEK), and that the key-encryption key (KEK) is then stored in the hardware key-store (507). These steps, however, are followed in each of the examples, and are implied in the steps of reclassification and relocation.

Figure 5:
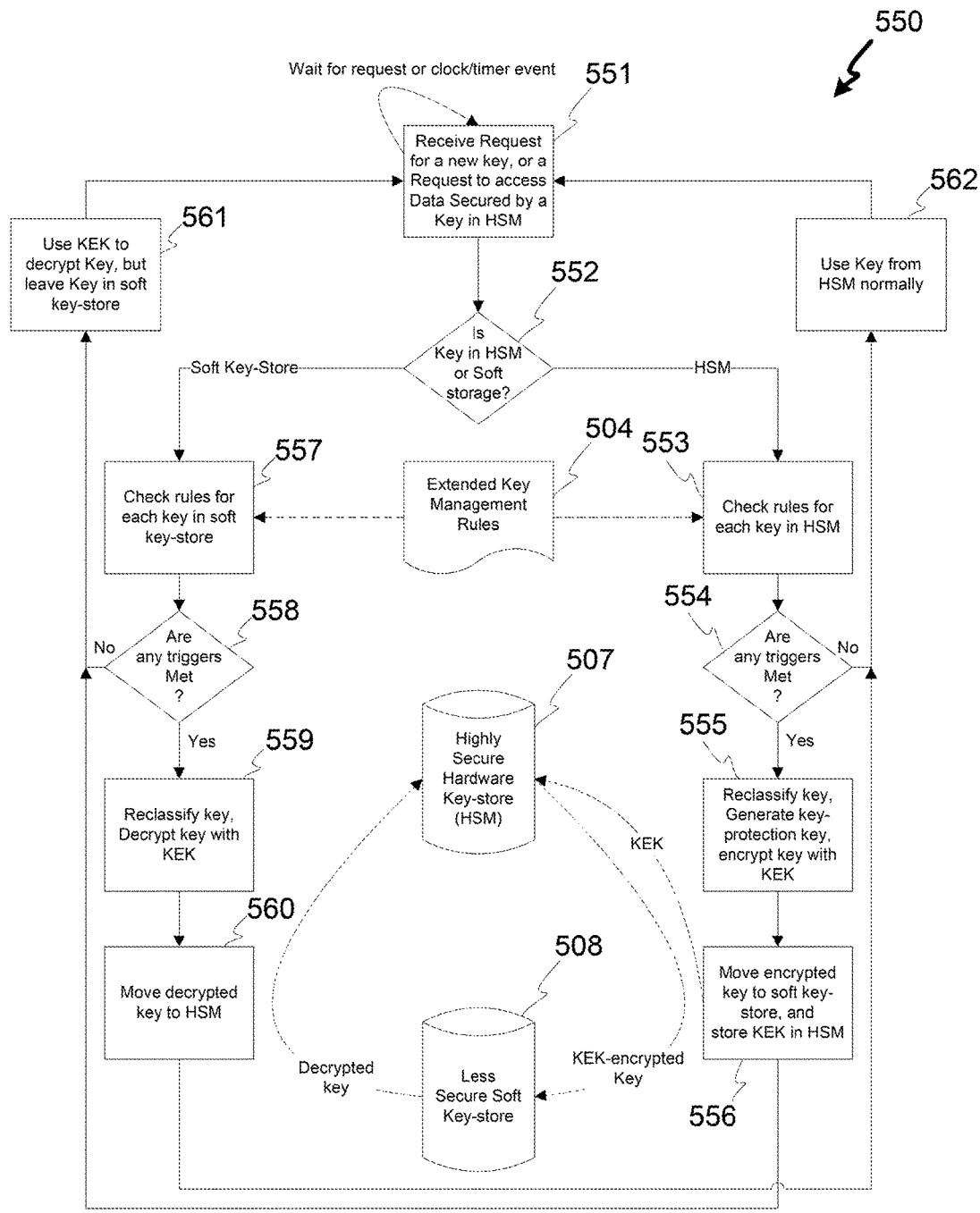
FIG. 5 illustrates a logical process of extended key management according to the invention.

Now referring to FIG. 5, the extended key management process (550) is shown in more detail, which begins by receiving (551) a request for a new key, a key operation, or access to data protected by a key which the requester expects to be stored in HSM (e.g. which would normally be stored in HSM according to the key management interface). However, since a process according to the invention is in place, a check (552) is made to determine if the key is currently actually in HSM or is stored in soft key-store. If it is currently in HSM, then the rules (504) are checked (553), and if any triggers are met (554), the key is reclassified, encrypted by a KEK (555), the key is moved (556) to soft key-store (508), and the KEK is stored (556) in the HSM (507), following which, the data may be accessed by decrypting the key using the KEK (561).

If no triggers are met (554), then the key is used normally (562) from the HSM (507).

If, however, the key is already in soft key-store (508) at the check (552), then the rules are checked (558). If any triggers are met, then the key is decrypted using the KEK and reclassified (559), and moved from soft key-store to HSM, following which, the key is used normally (562) from HSM. If no triggers are met (e.g. key is to remain in soft key-store), then the KEK is used to temporarily decrypt the key (561) for usage to access the data.

Computer Readable Storage Media Embodiments

It will be understood by those skilled in the art that certain embodiments of the present invention may include part or whole of the logical processes realized in circuitry, such as custom integrated circuitry and programmable logic devices. Yet, in other embodiments according to the invention, the logical processes may be realized in part or whole as software or firmware executed by a processor and requisite support circuitry, such as an HSM.

In the latter software-inclusive or firmware-inclusive embodiments, the software or firmware may be stored temporarily or long term in any suitable computer readable storage media such as RAM, ROM, hard disk, Compact Disc (CD), Digital Versatile Disc (DVD), etc. Additionally, such software or firmware may be initially stored on a first computer and downloaded to a second computer, where it is then stored in storage media of the second computer for execution by the second computer or for further transmission or forwarding to other computers. "Downloading" in this context is meant to include any means of transmitting the software or firmware from one computer to another, including client-server and peer-to-peer transmissions, and transfer over wired and wireless networks.

For example, the first computer may be a server, and the second computer may be a client (client-server arrangement). Or, both computers may be servers or both may be clients (peer-to-peer arrangement). The downloading means or transmission means may include a range of technologies, including but not limited to a Local Area Network (LAN), a Wide Area Network (WAN), an Intranet, an Internet, a World Wide Web, and various wireless networks, such as a Wi-Fi network, BlueTooth™, infrared (IrDA), radio modem, and wireless telephone networks.

CONCLUSION

The present invention has been described by setting forth certain operational and design concepts, and by providing certain specific embodiment examples using specific hardware and software details. It should be understood by those skilled in the art that these examples to not represent the scope and limits of the present invention, whereas other embodiments according to the invention may utilize other suitable hardware and software components.

What is claimed is:

1. A method for optimizing use of cryptographic key-store hardware security modules comprising:
   responsive to a first trigger being met, a processor reclassifying and encrypting a cryptographic key using a key-encrypting-key; and
   responsive to the reclassifying, a processor freeing memory space occupied in a hardware security module by the cryptographic key by relocating the encrypted cryptographic key into a soft key store;
   wherein a security certification level of the hardware security module is greater than a security certification level of the soft key store.

2. The method as set forth in claim 1 further comprising:
   responsive to a request to access data secured by the cryptographic key, a processor evaluating the relocated key against one or more rules;
   responsive to a second trigger being met:
      reclassifying by a processor the cryptographic key;
      decrypting by a processor the cryptographic key using the key-encryption-key;
      relocating by a processor the decrypted cryptographic key into the hardware security module; and
   responsive to the request to access the data secured by the cryptographic key, using by a processor the cryptographic key to provide access to the secured data per the request while retaining the cryptographic key in the hardware security module.

3. The method as set forth in claim 1 wherein the soft key store comprises a database.

4. The method as set forth in claim 1 wherein the first trigger comprises at least one event selected from the group consisting of a key revocation event, and a key expiration event.

5. The method as set forth in claim 1 wherein the first trigger comprises at least one rule selected from the group consisting of a key life cycle policy or rule, a key life cycle policy or rule, a data life cycle policy or rule, a key usage policy or rule, a data usage policy or rule, and a data reclassification policy or rule.

6. The method as set forth in claim 1 wherein the hardware storage module comprises hardware security in compliance with a Federal Information Processing Standard 140 encypher level selected from the group consisting of encypher level four, encypher level three, and encypher level two.

7. A computer readable storage memory device for optimizing use of cryptographic key-store hardware security modules comprising:
   one or more tangible, computer-readable storage memory devices which are not propagating signals per se; and
   program instructions encoded by the memory devices for causing a processor, when executed, to:
      responsive to a first trigger being met, reclassify and encrypt a cryptographic key using a key-encrypting-key; and
      responsive to the reclassifying, free memory space occupied in a hardware security module by the cryptographic key by relocating the encrypted cryptographic key into a soft key store;
   wherein a security certification level of the hardware security module is greater than a security certification level of the soft key store.

8. The computer readable storage memory as set forth in claim 7 wherein the program instructions are further for causing a processor, when executed, to:
   responsive to a request to access data secured by the cryptographic key, evaluate the relocated key against one or more rules;
   responsive to a second trigger being met:
      reclassify the cryptographic key;
      decrypt the cryptographic key using the key-encryption-key;
      relocate the decrypted cryptographic key into the hardware security module; and
   responsive to the request to access the data secured by the cryptographic key, use the cryptographic key to provide access to the secured data per the request while retaining the cryptographic key in the hardware security module.

9. The computer readable storage memory as set forth in claim 7 wherein the soft key store comprises a database.

10. The computer readable storage memory as set forth in claim 7 wherein the first trigger comprises at least one event selected from the group consisting of a key revocation event, and a key expiration event.

11. The computer readable storage memory as set forth in claim 7 wherein the first trigger comprises at least one rule selected from the group consisting of a key life cycle policy or rule, a key life cycle policy or rule, a data life cycle policy or rule, a key usage policy or rule, a data usage policy or rule, and a data reclassification policy or rule.

12. The computer readable storage memory as set forth in claim 7 wherein the hardware storage module comprises hardware security in compliance with a Federal Information Processing Standard 140 encypher level selected from the group consisting of encypher level four, encypher level three, and encypher level two.

13. A system for optimizing use of cryptographic key-store hardware security modules comprising:
a computer processor;
one or more tangible, computer-readable storage memory devices which are not propagating signals per se; and
program instructions encoded by the memory devices for causing the computer processor, when executed, to:
responsive to a first trigger being met, reclassify and encrypt a cryptographic key using a key-encrypting-key; and
responsive to the reclassifying, free memory space occupied in a hardware security module by the cryptographic key by relocating the encrypted cryptographic key into a soft key store;
wherein a security certification level of the hardware security module is greater than a security certification level of the soft key store.

14. The system as set forth in claim 13 wherein the program instructions are further for causing the computer processor, when executed, to:
responsive to a request to access data secured by the cryptographic key, evaluate the relocated key against one or more rules;
responsive to a second trigger being met:
reclassify the cryptographic key;
decrypt the cryptographic key using the key-encryption-key;
relocate the decrypted cryptographic key into the hardware security module; and
responsive to the request to access the data secured by the cryptographic key, use the cryptographic key to provide access to the secured data per the request while retaining the cryptographic key in the hardware security module.

15. The system as set forth in claim 13 wherein the soft key store comprises a database.

16. The system as set forth in claim 13 wherein the first trigger comprises at least one event selected from the group consisting of a key revocation event, and a key expiration event.

17. The system as set forth in claim 13 wherein the first trigger comprises at least one rule selected from the group consisting of a key life cycle policy or rule, a key life cycle policy or rule, a data life cycle policy or rule, a key usage policy or rule, a data usage policy or rule, and a data reclassification policy or rule.

18. The system as set forth in claim 13 wherein the hardware storage module comprises hardware security in compliance with a Federal Information Processing Standard 140 encypher level selected from the group consisting of encypher level four, encypher level three, and encypher level two.

* * * * *